United States Patent
Lipton et al.

(10) Patent No.: US 6,850,210 B1
(45) Date of Patent: Feb. 1, 2005

(54) PARALLAX PANORAMAGRAM HAVING IMPROVED DEPTH AND SHARPNESS

(75) Inventors: Lenny Lipton, Greenbrae, CA (US); Bruce Dorworth, Vacaville, CA (US); Robert Akka, Fairfax, CA (US)

(73) Assignee: Stereographics Corporation, San Rafael, CA (US)

( * ) Notice: Subject to any disclaimer, the term of this patent is extended or adjusted under 35 U.S.C. 154(b) by 0 days.

(21) Appl. No.: 09/831,818

(22) PCT Filed: Nov. 12, 1999

(86) PCT No.: PCT/US99/26676
§ 371 (c)(1), (2), (4) Date: May 9, 2001

(87) PCT Pub. No.: WO00/28517
PCT Pub. Date: May 18, 2000

Related U.S. Application Data

(60) Provisional application No. 60/108,268, filed on Nov. 12, 1998.

(51) Int. Cl.[7] .................................................. G09G 5/00
(52) U.S. Cl. ............................... 345/6; 345/8; 348/59; 348/51
(58) Field of Search .......................... 345/6, 8, 419; 348/46, 47, 59; 359/463, 619; 358/445

(56) References Cited

U.S. PATENT DOCUMENTS

| | | | |
|---|---|---|---|
| 3,901,595 A | * | 8/1975 | Helava .......................... 356/2 |
| 4,959,641 A | * | 9/1990 | Bass et al. ..................... 345/6 |
| 5,438,429 A | * | 8/1995 | Haeberli et al. ............. 358/445 |
| 5,497,189 A | * | 3/1996 | Aritake et al. ................ 348/51 |
| 5,543,964 A | * | 8/1996 | Taylor et al. ............... 359/463 |
| 5,717,453 A | * | 2/1998 | Wohlstadter ................. 348/46 |
| 5,764,231 A | * | 6/1998 | Ray et al. .................... 345/419 |
| 5,959,664 A | * | 9/1999 | Woodgate ..................... 348/59 |
| 6,014,259 A | * | 1/2000 | Wohlstadter ................ 359/619 |
| 6,233,003 B1 | * | 5/2001 | Ono ............................ 348/47 |

OTHER PUBLICATIONS

A. Kalai and M. Siegel, Improved Rendering of Parallax Panaramagrams for a Time–Multiplexed Autostereoscopic Display, Jan., 1998, Proceedings of the 1998 SPIE/IS&T Conference, vol. 3295A, pp. 211–217.*

* cited by examiner

*Primary Examiner*—Chanh Nguyen
*Assistant Examiner*—Uchendu O. Anyaso
(74) *Attorney, Agent, or Firm*—Richard A. Nebb; Dergosits & Noah, LLP

(57) ABSTRACT

A parallax panoramagram has increased depth and sharpness when a sharpness filter is applied after interdigitation of multiple image portions. An optical path of wave train (204) (on-axis) and wave train (205) (off-axis) intersect a single lenticle (201). The lenticle has a focal length (208) and the on-axis (204) and off-axis (205) wave trains correspond to different stripes. These wave trains (204 and 205) comme to focus at points (206 and 207) respectively. The surface (202) has a cylindrical curvature, and bracket (203) denotes the width of the lenticle (201). Each eye of the observer sees its own perspective view when looking at a lenticular stereogram.

1 Claim, 1 Drawing Sheet

PARALLAX PANORAMAGRAM HAVING IMPROVED DEPTH AND SHARPNESS

This application is a 371 of PCT/US99/26676 filed Nov. 12, 1999 which claims benefit of 60/108,268 filed Nov. 12, 1998.

FIELD OF THE INVENTION

This invention relates to parallax panoramagrams, also known as lenticular stereograms, and more particularly, to a method for increasing the depth and sharpness of images in lenticular stereograms.

BACKGROUND OF THE INVENTION

For many decades, inventors have studied and attempted to improve the lenticular stereogram, also known as the parallax panoramagram. The art has been very well traveled and is very well understood. By incorporating a cylindrical lenticular screen, corduroy-like, over the surface of a properly encoded print, a stereoscopic depth effect may be achieved. As shown in FIG. 1, the lenticules 102 have semi-cylindrical surfaces aligned so that their length is in the vertical direction. The lenticules are in intimate juxtaposition with a print surface 105, which contains columns of encoded visual information. Each column is associated with a particular lenticule, and within each column there will be found a series of views ranging from a leftmost to a rightmost perspective. Thus, the observer of a panoramagram print will see two perspectives rather than one due to the refractive surface of the panoramagram.

There are many prior art suggestions which are similar to the lenticular stereogram in their effect. These autostereoscopic displays have several features in common. For one thing, the selection device is in intimate juxtaposition with the display or print surface. For another, a large number of views is required, rather than just two views as is the case for a plano-stereoscopic display like the polarized light method for motion picture projection, or in the occlusion principle which is incorporated in the CrystalEyes® line of products manufactured by StereoGraphics Corporation.

It has been noted that the panoramagram depth content must be restricted because of the lack of sharpness as depth increases. Inventors have addressed this problem with various suggestions for making improvements. Indeed, in the case of a series of patents assigned to the Nimslo Corporation in the early 1980's, the essence of their art for a mass-consumer lenticular and camera print system is to provide a means for the operator to make an adjustment to place the most important part of the picture at the print surface, with zero parallax, so it would be sharp. It was understood at that time and even to this day, that only the subject which is at the plane of the display will be sharply in focus. Prior patents which discuss this problem and/or solutions include U.S. Pat. Nos. 3,960,563; 4,037,950; 4,063,265; 4,086,585; and 4,124,291.

Stereographers have accepted this limitation. Those working in the field have been able to mask the defect, because it can be made to appear to be identical to the loss of sharpness which occurs in normal photographic reproduction due to depth of field effects. Indeed, in a typical panoramagram having a distant background and powerful stereoscopic effects which reach above the plane of the display, there will be an attempt to mask the lack of sharpness by suggesting that loss of focus is attributable to depth of field. This is a limitation that those skilled in the art of creating such displays have gotten around because of their artistic skill. Yet it is clear that the major benefit of the parallax panoramagram is to offer depth content. As long as the depth content is compromised, the display cannot be considered to be a fully perfected visual medium.

The present invention sets out to vastly increase the sharpness of the parallax panoramagram, and do so with means that are inexpensive and which produce an unequivocal improvement in sharpness for objects both in the distance and apparently close to the observer.

DETAILED DESCRIPTION OF THE INVENTION

Figure 1A:
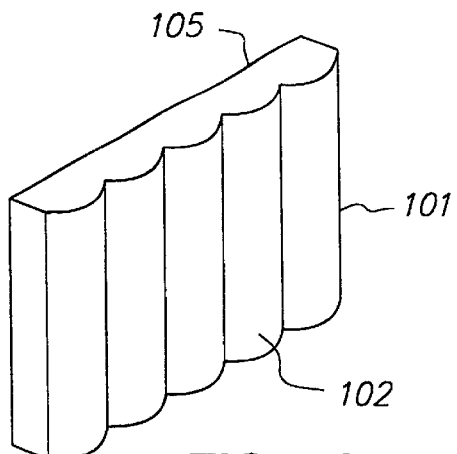
FIG. 1A is a perspective view of the structure of a lenticular stereogram.

FIG. 1A is a perspective view of a parallax panoramagram, also known as a lenticular stereogram, having a lenticular screen 101 and its associated print image 105. Screen 101 is comprised of individual cylindrical lenticules 102. The front surface of the print 105 is in intimate juxtaposition with the back of the lenticular screen 101. The optics and organization of lenticular displays are generally well known to those in the art and are therefore not described in any detail. Our discussion is confined to descriptions that are relevant to the improvement of depth and sharpness disclosed herein.

Figure 1B:
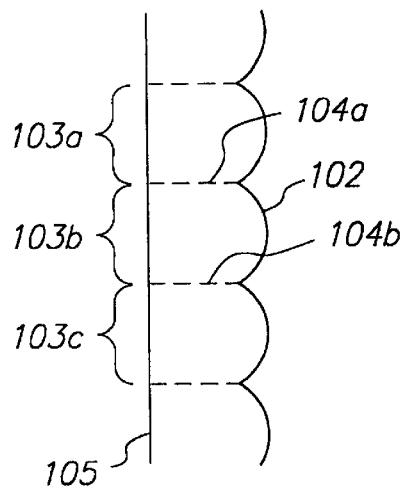
FIG. 1B is a top view of the lenticular stereogram of FIG. 1A.

FIG. 1B is a top view of the lenticular screen 101 and associated print surface 105 of FIG. 1A. The dotted lines 104a and 104b are for reference only and are perpendicular to the print surface 105. These lines 104a and 104b are meant to indicate the area under a particular lenticule which is devoted to the image that is specifically associated with that lenticule. Brackets 103a, 103b and 103c are drawn at the surface of the print surface 105 to indicate the extent and width of a column.

Figure 1C:
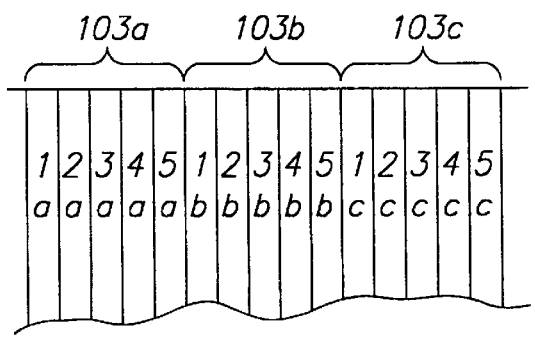
FIG. 1C is a schematic diagram illustrating the image columns of a lenticular stereogram.

In FIG. 1C columns 103a, 103b and 103c each have five individual image stripes, each stripe representing a particular section of a perspective view. It is well understood in the art that the leftmost and rightmost views are interchanged because of the refraction of the lenticular screen, which by its nature takes place only in the horizontal direction. For example, stripe 1a is the rightmost view and stripe 5c is the leftmost view. For didactic purposes, we are restricting the number of image stripes to five. It should also be pointed out that if a panoramagram camera is employed which might produce, in effect, an optical continuum across the width of a column, the discussion below would still apply because the effect of such a continuum being wiped across a screen by means of a slit shutter, or by optical means, can always be resolved in terms of discrete pixels and hence in terms of discrete stripes.

The term "pixel" is generally understood to mean a discrete picture, element of a single color value which, in large quantities, make up a raster display, or a raster bitmap, or a raster printout. We are using the term "pixel cluster" to mean an image element derived from a component bitmap, several of which make up a row of a lenticule column. Our pixel clusters are square with their height and width the same dimension as the width of a stripe.

The pitch of the lenticular screen is defined as the number of lenticules in the horizontal direction. For example, a screen with 58 lenticules to the inch has a pitch of 58, and the width of the lenticule is the reciprocal of the pitch.

As has been noted, parallax panoramagrams may be produced in a number of ways. In the past, the means available for producing a panoramagram have been restricted to cumbersome cameras, which might require motion of the camera across several feet over a period of many seconds. This effectively restricted the subject matter to still lifes or to people who were required to hold still for a long time.

The later variations of the art, notably work done by Dudley, introduced the concept of interdigitating images for multiple camera views, thus replicating the effect of the panoramagram and which, in essence, has look-around capability (which is another way of saying that the position of the observer's eyes is not tightly restricted).

To make panoramagram viewing enjoyable, there must be a reasonable angle of view over which the image may be viewed. As is well known in the art, there is a central or primary zone which is followed by a pseudo zone in which, because of the refractive property of the optics combined with the location of the observer, over a certain angle of view in space there will be a mixed combination of stripes from adjacent columns. Then follows a secondary zone which is stereoscopic and a pseudo zone and then a stereoscopic tertiary zone and these zones are symmetrically placed on either side of the primary zone.

It has been observed that the panoramagram suffers a significant loss of sharpness which is more or less proportional to parallax, and yet parallax is the principal information which determines the stereoscopic depth effect. Therefore, parallax panoramagrams in the prior art have been limited in terms of their depth effect.

Figure 2:
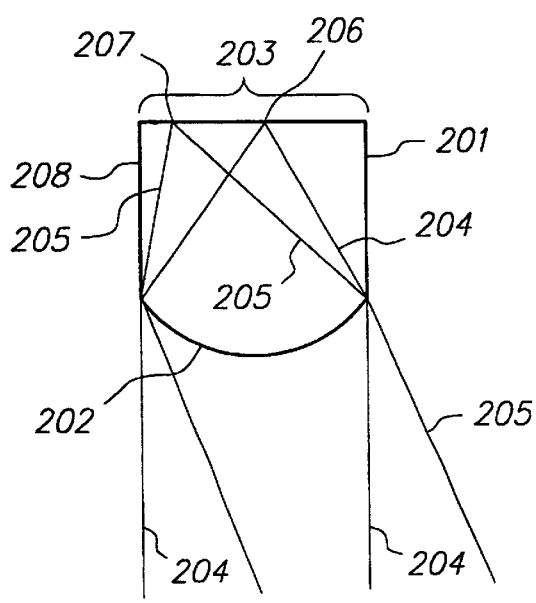
FIG. 2 shows the optical path of axial and off-axial rays for a single and representative lenticule of a lenticular screen.

In order to better understand this problem, we refer to FIG. 2, which shows the optical path of wave train 204 (on-axis) and wave train 205 (off-axis) intersecting a single lenticule 201 of a lenticular sheet or screen. These wave trains represent the image forming rays that will intersect with the eyes of an observer looking at the lenticular stereogram. Surface 202 has a cylindrical curvature and in this horizontal section is a sector of a circle. The focal length of the lenticule is approximately the length of the line 208. Wave trains 204 and 205 come to focus at points 206 and 207 respectively. Bracket 203 denotes the width of lenticule 201, which corresponds to any one of the columns 103a through 103c shown in FIGS. 1B and 1C. Focal point 206 corresponds to a central stripe, for example stripe 3, and focal point 207 corresponds to another stripe, for example stripe 2.

Each eye of the observer sees its own perspective view when looking at a lenticular stereogram. For example, the observer may see image stripes 2a, 2b, 2c and so on for the right perspective view and image stripes 3a, 3b, 3c and so on for the left perspective view. With only five stripes per column (in this example), one might conclude that the observer only sees twenty percent of the image with each eye and thus sees a series of stripes rather than an entire image, but that is not the case. Further, if each eye is only seeing twenty percent of the image, one might conclude that the image would be substantially reduced in brightness, but that is not the case.

What we have not considered is the focal spot size formed by the optics. In this case, the spot size is an ellipse which may have a width greater than the width of a single stripe because of optical limitations. It is well known that even the best corrected optics cannot focus to a "perfect" point because of aberrations. The size of the spot is influenced by how well the optics are focused and how well they are corrected, since some aberrations may cause a spread of the spot size. Assuming that the focal length of the lens matches the distance from its optical center to the surface 203, such a simple lens cannot be well corrected because it cannot bring all wavelengths to focus at the same point. This lack of color correction is only one issue.

The lenticules in a typical lenticular sheet are poorly corrected compared with, for example, a box camera lens. In addition, off-axial focal spots may be even more spread out than axial spots for both optical and geometric reasons. Nevertheless, the optics do a decent job as will be observed when viewing the secondary zone image, which usually looks about as sharp as the primary zone. If the diminution in performance of off-axial rays are the key to the loss of sharpness in a lenticular stereogram, then this loss of sharpness would be exacerbated when viewing secondary zone images, and this is simply not the case.

However, the questions about missing information and loss of brightness because of stripe width and focal spot size get right to the heart of the matter. The observer does not see a series of stripes because of the imperfections of the optical system. This is to a great extent helpful because it would be unpleasant to have the experience of looking through a vertical grating. Also, there is little difference between prints with and without the lenticular screen having been applied. This tells us that the image is formed from a number of adjacent stripes having been combined rather than from a particular stripe being available for each eye as would be implied by the simple model. Although the device produces the necessary stereoscopic effect, because of the unwanted combining of adjacent stripes we have created a significant optical problem which manifests itself as image blurring for corresponding points with large parallax values.

To help understand why this is so, consider the case of an image residing entirely at the plane of a print with all of the stripes having zero parallax. The image stripes would all be identical and it does not matter if adjacent stripes are combined by the imperfect optical system. In such a case, the image will be sharp because like stripes are added together. But with large values of parallax, stripes adjacent to each other are pictorially out of context with each other. They represent disparate segments of the puzzle that make up a panoramagram image. In such a case, the effect of the spot size overlapping adjacent stripes will result in image blur. Although the corresponding point information may be emphasized from the stripe sitting at the center of the focal spot, images contributed by the stripes on either side of the desired or center stripe (relatively speaking) contribute to a degradation of sharpness. When unwanted image information is added, the result is a lack of sharpness, and the effect is proportional to parallax since the greater the parallax the lesser the correlation between adjacent stripes within a column.

Presently, panoramagrams are produced by digital techniques using a computer. Graphics workstations are frequently used although a modern personal computer has adequate resources to perform the required techniques by using off-the-shelf software such as Adobe Photoshop. Typically, a digital image is produced as a Windows bitmap (BMP) having a 24 bit RGB format.

The images may be taken with standard cameras using silver-based materials, or with digital cameras. If taken with standard silver-based cameras, the images must first be digitized. Each image is sliced up into stripes, and these stripes are then ordered into columns. The columns are then ordered into groups of stripes, as shown in FIG. 1C, which shows portions of three adjacent columns made up of stripes numbered 1 through 5.

The five stripes represent five image elements, or pixel clusters, derived from five original image components. Because the lenticule pitch tends to not be a precise multiple of the pitch of the printing device, the image elements typically do not correspond to actual pixels. Thus, the original image components need to be interdigitated using one of several possible techniques. One technique, based on standard anti-aliasing, is to compute how each image element should map to the actual pixel grid, and have that image element contribute to the pixel(s) that it maps to based on weighted averaging with other image elements. Another technique is to find the single image element that maps to a particular pixel better than any other image element, and assign the best image element's color value to that pixel.

Within each column, a stereo pair is represented by the combination of any two stripes. For example, stripe 1 and stripe 2 is a stereo pair, and stripe 2 and stripe 5 is a stereo pair. The subscripts appended to the stripe number in the drawing denotes that the stripe belongs to a particular column 103a, 103b or 103c.

The technique for enhancing the sharpness of the panoramagram, or enhancing its depth (the two go together, for improving the sharpness actually enhances the ability to create deeper images), consists of applying a sharpening filter to the interdigitated image, such as the filters found in Adobe Photoshop. That is, after the individual perspective views have been sliced up and ordered into stripes and then ordered into columns, it is at this point that a sharpening filter is used. In the course of creating this invention, all of the sharpening filters in Photoshop were used in experiments, including the Unsharp Mask, which in particular allows one to vary the amount of sharpness applied on an incremental basis. In brief, a sharpening filter increases the contrast between the adjacent pixels. Using this technique produces an astonishing improvement in the lenticular stereogram, to the extent that images with very large values of parallax and depth effect are now gratifyingly sharp for all parts of the image. This is a completely unexpected result and one that produces a tremendous improvement in the sharpness of images with large parallax values.

Although the image sharpness and depth of the panoramagram is vastly enhanced using the technique described herein, we found that a disturbing artifact was produced by the process. As described above, lenticular stereogram images have a good primary zone, followed by a pseudo zone, then a secondary zone, and then a tertiary zone. We found that in the transitions between zones after the sharpening filter had been applied, there appeared to be harsh vertical lines which made the transitions extremely obtrusive. This is an undesirable artifact of the beneficial improvement. Happily, we have found a way to eliminate the visibility of the coarse vertical structure, but before describing it, we shall describe why sharpening filtration applied to the interdigitated image produces the beneficial result.

We described above why sharpness is lost as a result of the unwanted blending together of information from adjacent stripes. While such blending has the salutary effect of producing an integral image free from annoying vertical stripes, this blending of image information from adjacent stripes containing image points with high parallax values is the root cause of the blurring of the lenticular stereogram. Our process, which involves sharpening of the interdigitated image, produces greater contrast or differentiation between adjacent stripes. In this way, the primary stripe, i.e. the stripe which is at the center of the focal spot, is emphasized with respect to the adjacent stripes. The observation that increasing the sharpening filtration for large values of parallax is required tends to support this hypothesis. In addition, the fact that treating the images that make up the source of the lenticular stereogram prior to interdigitation has no beneficial effect also tends to support this hypothesis because the beneficial sharpening must take place not within the pixel clusters but rather between the stripes.

We also get a feeling for why the harsh vertical stripe artifact occurs between columns. The sharpening filtration when applied treats all adjacent stripes, even those at column boundaries and these may have very low correlation. This treatment produces an exacerbation of the boundary between columns. Thus, this harsh artifact is caused by the apparent edge that the sharpness filter's edge detection algorithm frequently finds at a lenticule column boundary. Since such apparent edges are caused by parallax discontinuity, and not by actual edge features in the scene, it is not desirable for the sharpness filter to enhance their sharpness. The cure, as described below, is to soften the boundary.

Boundary stripes, for example, stripes 5a and 1b or stripes 5b and 1c, are relatively unrelated in terms of image context, and thus the sharpening filter produces the harsh vertical artifact described. The cure is to use an averaging technique to soften the boundary stripes. This can be accomplished in a number of different ways.

One way to accomplish this is to shrink the image elements in each lenticular column such that each lenticular column now fits two additional image element fields thus, in our ongoing example, we would now have seven image elements per lenticular column instead of the original five. (In experiments, we have actually used more like twenty original image elements per lenticular column). The two new image elements are added along each edge of each lenticular column. Thus, the original five image elements per column, originally numbered 1 through five, became image element numbers 2 through 6 out of 7 total, and the newly added image elements become image element number 1 and 7. With any given pair of columns, the last image element (#7 in this example) of the first column and the first image element (#1) of the next column are each assigned a color value which equals the average of the second to last image element (#6 in this example) and the second image element (#2) of the next column. Color value averaging is accomplished by separately averaging red, green and blue color component values.

Overall, the important technique is to essentially soften the discontinuity between adjacent lenticules. Once this has been accomplished, the artifact is greatly reduced or eliminated. To reiterate, the important steps are: interdigitate image components while applying an averaging technique, or a softening technique, to the lenticule column boundaries, and then apply a sharpening filter after the image has been interdigitated. It should be pointed out that this technique does not add any additional artifacts and does not reduce either the depth content of the stereogram or the extent of the viewing zone.

A further refinement would be to add sharpening which is proportional to the parallax of the image points. This could be done by creating a table of parallax values using the extreme left and right perspective views for the creation of such a table. The table could then be used to add an increasing amount of sharpness as a function, most beneficially as a linear function in many instances, to the image points. In point of fact it is rarely required since we have observed that a single value for the sharpening filtration usually produces a decent effect.

The results of the techniques described herein are entirely unexpected, are not predicted by the prior art, and have the great advantage of allowing the use of standard lenticular screens without any additional optical correction. Such correction would involve additional expense in terms of designing and calculating such a screen, if indeed it is possible to put such a design into practice, and then a great deal of money would have to be spent in actually fabricating such a lenticular screen.

The present invention, by using computer techniques as described herein, avoids a costly and uncertain development process which would have undoubtedly resulted in lenticular screens that would be even more costly than the present product.

The present invention produces an entirely unexpected and startling improvement in the panoramagram, and does so for a very low cost. The result is beneficial, and any observer would agree that such panoramagrams have a significantly extended depth content as a result of the application of this technique. In addition to the technique described here, it is also possible to apply sharpening in the vertical direction only. When this approach is used, there is a noticeable improvement in sharpening, and little or none of the artifact described above.

Yet another approach or variation on the technique described above is to reverse the order of the stripes left to right within a column. As has been described above, right now each column has stripes which are ordered in a mirror image because of the optical inversion of the lenticular screen. As an intermediate step in using this technique, if the stripes are left uninverted with respect to left and right orientation, and the sharpness filter is applied, because the material between adjacent columns is related in terms of context, then the artifact described here will not be produced. After the sharpening filter has been applied, the columns must now have their stripes inverted left to right to produce a panoramagram with the normal viewing characteristics.

We believe the increase in sharpening comes about because the aberration defects as described in FIG. 2 have been overcome. Principally, the increased aberration in marginal or non-axial stripes, that is, stripes which are away from the center of the column, leads to a reduction in contrast, or a reduction in modulation transfer function. The reduced efficiency of the optic with regard to the ability to reproduce spatial frequencies with contrast is most marked for the marginal stripes. We believe that the higher spatial frequencies may well be lost, but the lower frequencies have boosted contrast as a result of the sharpness correction.

We claim:

1. A method for forming a parallax panoramagram, comprising:

providing a plurality of digitized images having parallax therebetween, each image being defined as a plurality of pixels;

slicing each of the digitized images into a plurality of corresponding vertical image stripes, each image stripe having a width being defined as a cluster of pixels;

ordering the corresponding image stripes into columns; and increasing the contrast between adjacent pixels at a boundary between two columns by shrinking the size of the image stripes so that more image stripes fit into the columns, and assigning a color value to a last image stripe of one column and a first image stripe of a next column, wherein the assigned color value is determined by averaging the color values of a second-to-last image stripe in the one column with a second image stripe in the next column.

* * * * *